Nov. 21, 1950 S. B. KENT 2,531,221

DELAYED AUDIBLE CALL SIGNAL FOR TELEPHONE SUBSTATIONS

Filed Aug. 27, 1947 2 Sheets-Sheet 1

INVENTOR
S.B. KENT
BY J W Schmied
ATTORNEY

Nov. 21, 1950 S. B. KENT 2,531,221

DELAYED AUDIBLE CALL SIGNAL FOR TELEPHONE SUBSTATIONS

Filed Aug. 27, 1947 2 Sheets-Sheet 2

INVENTOR
S. B. KENT
BY J. W. Schmied
ATTORNEY

Patented Nov. 21, 1950

2,531,221

UNITED STATES PATENT OFFICE 2,531,221

DELAYED AUDIBLE CALL SIGNAL FOR TELEPHONE SUBSTATIONS

Stanley B. Kent, Port Washington, N. Y., assignor to Bell Telephone Laboratories, Incorporated, New York, N. Y., a corporation of New York Application August 27, 1947, Serial No. 770,795

6 Claims. (Cl. 179—84)

This invention relates to electric signaling and particularly to signaling facilities for use at telephone subscribers' stations.

The signal equipment commonly used at telephone subscribers' stations to indicate the arrival of telephone calls thereat consists of an electromagnetically operated device, generally characterized as a ringer, which responds to each application of ringing current to a subscriber's line to produce audible signals of uniform intensity. In some instances it has been found desirable to precede such an audible signal with a distinctively different type of preliminary call signal, usually in the nature of a visual signal of relatively low attention-arresting quality. It has been found desirable also in some installations involving preliminary visual and secondary audible signals to render the audible signaling device responsive to incoming signaling current only in the event the preliminary call signal is not answered within a predetermined interval of time.

It is the object of this invention to provide an improved system of telephone signaling involving preliminary and secondary call signals at telephone subscribers' stations.

This object is attained in accordance with a particular feature of the invention by the provision of novel subscriber-controlled means for variably delaying the operation of an audible signal device relative to the operation of a preliminary signal of the usual type. More particularly, the improved signaling facilities of this invention comprise a lamp signal which responds, as a preliminary visual signal, to ringing current incoming over a telephone subscriber's line; an audible signaling device which functions a predetermined interval of time after the response of the visual signal; light sensitive control means for enabling the audible signaling device at the termination of the predetermined time interval; and subscriber-controlled means for regulating the length of the predetermined interval of time.

In accordance with another feature of the invention the light energy employed to activate the signal-enabling light-sensitive control means is derived from the preliminary visual signal.

A further feature of the invention resides in the use of means which precludes the possibility of lost calls at a subscriber's station because of failure of the preliminary visual signal thereat.

Figures 1, 2, 3, 4:
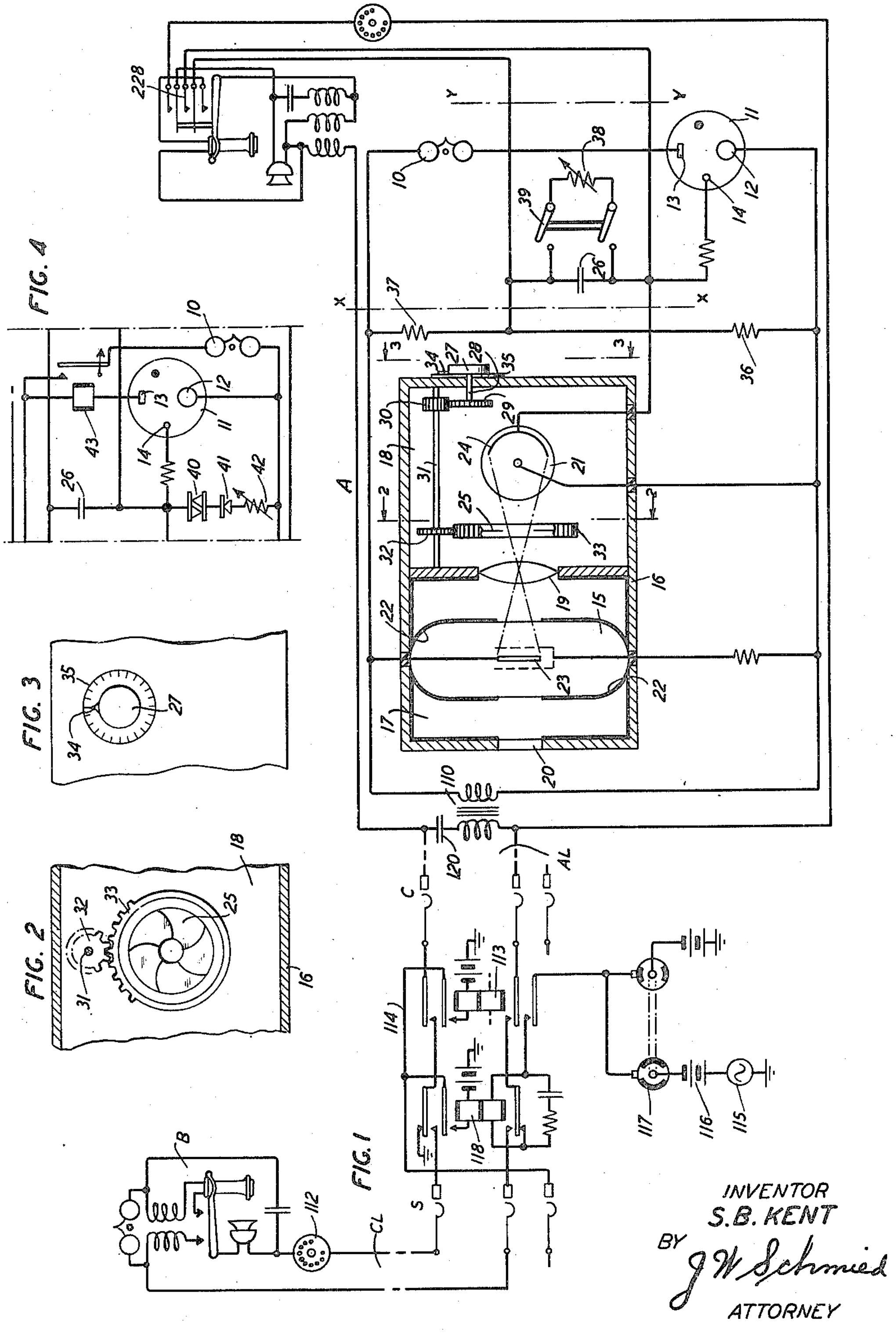
Figure 5:
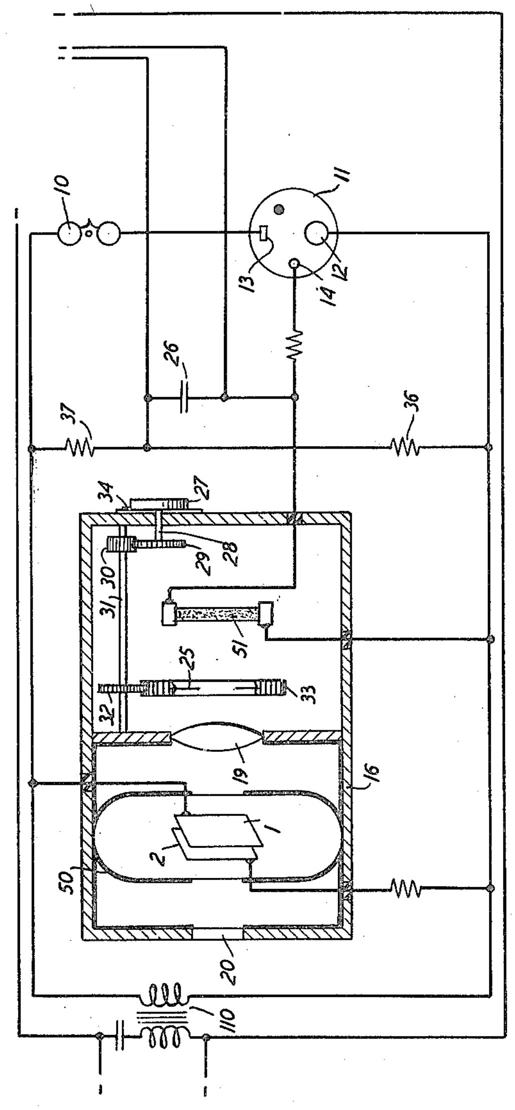

These and other features of the invention will be readily understood from the following detailed description when read with reference to the accompanying drawings, in which:

Fig. 1 shows diagrammatically a telephone system of the full automatic type involving a called subscriber's station equipped with the signaling facilities of this invention;

Figs. 2 and 3 are illustrations of mechanical details involved in the subscriber-controlled means for regulating the time interval between preliminary and secondary signals and are taken along the lines 2—2 and 3—3 respectively of Fig. 1, looking in the direction of the arrows;

Fig. 4 is a circuit diagram of a portion of a subscriber's line circuit and illustrates a modification of the facilities disclosed in Fig. 1; and Fig. 5 is a circuit diagram illustrating a further modification of the invention shown in Fig. 1.

In the system illustrated in Fig. 1 a subscriber's line AL, with which is associated the substation A, terminates at a central office in terminals of the connector C. As previously indicated, the subscriber's station is equipped with combined visual and audible signaling instrumentalities, the latter being in the form of the well-known electromagnetic telephone ringer indicated at 10. The ringer 10 is connected across the secondary winding of transformer 110 in series with the main gap of a gaseous discharge trigger tube 11 which includes a cold cathode 12, an anode 13 and a control electrode 14. As will appear more fully from a later description, ringing current from a source 115 at a telephone exchange is impressed on the primary winding of transformer 110 and thence by induction on the transformer secondary across which the ringer 10 and the main gap of tube 11 are connected. The trigger tube 11 will not fire on normal ringing current unless the control electrode 14 is made positive with respect to the cathode 12.

The visual signaling instrumentality consists of a gaseous discharge lamp 15 which is electrically bridged across the secondary winding of transformer 110 and physically housed within the left compartment 17 of an effectively light-tight box 16. The box 16, which may be located in close proximity to the telephone at station A includes a dividing wall which separates the left compartment 17 from a right compartment 18. At substantially its mid-section the dividing wall of the box 16 is apertured to provide a fixed support for a lens 19. The inner surfaces of the space-limiting walls of the left compartment 17 of box 16 are painted black in order that light rays entering a translucent window 20 located in the left wall of box 16 from external sources may be absorbed and thus precluded from influencing the photoelectric tube 21 housed in the right compartment 18. To further prevent external light from reaching the phototube 21 the glass envelope of lamp 15 may also be painted black except for those areas which face the window 20 and the lens 19. This painting of the lamp 15 is indicated by the numeral 22. The cathode 23 of lamp 15 is opaque and prevents any direct rays of light from window 20 reaching lens 19 and the tube 21. When the lamp 15 is energized by ringing current incoming over line AL one side of the cathode 23 illuminates the window 20 to provide a visual signal while light from the other side of the cathode 23 energizes phototube 21 under conditions and in a manner to be described presently.

The photoelectric tube 21 may be of any well-known design and is suitably mounted in the right compartment 18 of the box 16. The cathode 24 of tube 21 is disposed in horizontal alignment with lens 19 and the cathode 23 of lamp 15 so that when the lamp 15 is lighted the lens 19 forms an image of the cathode 23 of lamp 15 on the cathode 24 of phototube 21.

Interposed between the lens 19 and the phototube 21 is an iris screen or shutter 25 of any well-known design which functions to regulate the amount of light which reaches the phototube 21 from the light source 15 through the lens 19. Through means, to be described presently, the iris shutter 25 may be adjusted from a fully closed position, at which no light from the source 15 reaches the phototube 21, to a completely open position, at which a maximum amount of light rays impinge on the cathode 24 of phototube 21. When the iris shutter is completely closed the phototube 21 will not be activated even when lamp 15 is lighted. When the shutter is set wide open the activation of the tube 21 will be a maximum. As will be described hereinafter the extent of the illumination of phototube 21 determines the rate at which condenser 26 charges and the time which elapses between the lighting of lamp 15 and the operation of ringer 10.

The control of the iris shutter 25 is effected by means of a manually rotatable knob 27 which is mounted on the right extremity of a short shaft 28 which is suitably housed in and projects from a circular aperture in the right vertical wall of the box 16. A gear 29 is fixed to the inner end of shaft 28 and is in constant mesh with pinion gear 30 which, in turn, is fixed to a shaft 31 near its right end. The shaft 31 may be housed for rotation in suitable apertures in the right and dividing walls of the box 16. Near its left end the shaft 31 carries a gear 32 which, as clearly shown in Fig. 2, is in constant mesh with sectional gear 33 associated with the iris shutter 25. Rotation of the knob 28 in one direction from zero position causes the opening of the iris shutter to increase from zero to maximum. Any intermediate opening of the shutter may be obtained by setting the knob pointer or indicator 34 to any corresponding position on the dial 35. The dial may be graduated in delay indicia.

It will be observed that condenser 26 is connected across the secondary of transformer 110 in series with resistance 37 and the space path of the phototube 21 and that the condenser controls the potential applied to the control electrode 14 of the trigger tube 11. The charge on condenser 26 is determined by the extent of the illumination of the phototube 21 and since the delay in firing trigger tube 11 is determined by the charge on condenser 26, the delay imposed on the operation of the ringer 10 is a function of the phototube illumination. During the negative half wave of ringing current in the secondary of transformer 110 the condenser 26 is charged to an amount dependent upon the illumination of tube 21. During the positive half cycle the anode 13 of trigger tube 11 is positive with respect to the cathode 12 and the tube will fire if the control anode 14 is sufficiently positive with respect to the cathode 12. The voltage on condenser 26 is trapped during the positive half wave and adds to the voltage drop across resistance 36 to render the control anode 14 more positive. When, on successive alternations of ringing current the condenser 26 accumulates sufficient charge the potential on the control anode 14 will reach a value at which the tube 11 fires. When the tube 11 fires the space path from anode 13 to cathode 12 is completed and the ringer 10 is energized on the incoming ringing current to give an audible signal. The herein described photoelectric control of gas tube 11 is a variation of the control system disclosed in a copending application, Serial No. 749,725, filed May 22, 1947, now Patent No. 2,481,667 issued September 13, 1949, W. H. T. Holden.

Since the delay in firing trigger tube 11 and therefore, in the operation of the audible signal 10 is, as previously stated, a function of the illumination of phototube 21, the lapse of time between the lighting of visual signal 15 and the operation of the ringer 10 may be controlled by regulating the amount of light from lamp 15 that is permitted to activate the phototube 21. This regulating operation is subscriber-controlled and is performed through the media of the iris shutter 25 and the associated manually operable knob 27 in the manner hereinbefore described.

The system disclosed in Fig. 1 operates in the following manner: For purposes of description it will be assumed that a subscriber at station B on line CL originates a call to the line AL which is allocated to the substation A at which there is located the dual signaling instrumentalities of this invention. The calling subscriber initiates the call in the usual manner and operates the dial 112 to cause the extension of the line CL to the called line AL by way of automatic switches such as the schematically illustrated selector switch S and the connector switch C.

When the connector C has been set on the terminals of the called line AL and has found the line to be idle relay 113 operates in the well-known manner and locks over its upper winding and contact to the sleeve conductor 114 which is grounded at this time. Relay 113 closes the ringing circuit which may be traced from the generator 115, through battery 116, interrupter 117, lower front contacts of relay 113, through the lower winding and lower back contact of tripping relay 118, inner lower front contact of relay 113 over the ring brush of connector C and its associated terminal, through the primary winding of transformer 110 and condenser 120, and returning over the upper or tip terminal and associated brush of connector C, outer upper front contact of relay 113 to ground at the outer upper back contact of relay 118. During the ringing interval of interrupter 117 alternating ringing current from the source 115 flows through the primary winding of transformer 110 and induces a corresponding voltage across the secondary winding thereof. The lamp 15 is energized by this voltage over an obvious circuit and furnishes a visual indication of the incoming call at station A.

For descriptive purposes only it will be assumed that the subscriber at station A has elected to have incoming calls indicated by a visual signal only. In this case the knob 27 is operated to a position in which the iris shutter 25 is completely closed thus precluding the transmission of light rays from the lamp 15 to the phototube 21. Obviously therefore, the phototube would never become activated and condenser 26 would not charge. The normal ringing current is incapable of firing the trigger tube 11 and the ringer 10 would remain on open circuit with respect to the incoming signaling current. The ringer therefore would not function to audibly indicate the incoming call.

If the subscriber at station A had set the knob at some intermediate position, a definite amount of light from lamp 15, by way of lens 19 would become available to activate the phototube 21 with the result that the condenser 26 charges on successive negative half waves of ringing current until the charge thereon plus the drop across resistance 36 is sufficient to raise the potential of the control anode 14 of the trigger tube 11 to a value at which the tube 11 fires. When this occurs the energizing circuit for ringer 10 is completed and an audible signal sounded. The duration of the interval of time between the lighting of lamp 15 and the operation of ringer 10 is determined by the setting of the iris shutter 25. If the shutter had been positioned so that a maximum amount of light energy from lamp 15 was permitted to activate the phototube 21 the ringer 10 would operate substantially simultaneously with the lighting of the lamp 15.

Upon receipt of the signal indicative of the incoming call the subscriber at station A removes the receiver from its support to complete the communication circuit to his substation equipment in the usual manner. A switchhook contact 228 is provided to short-circuit condenser 26 and thus silence the ringer 10 or to prevent its operation if the receiver is lifted before the trigger tube 11 has fired.

When the called subscriber answers, as described, increased current flowing through relay 118 causes the relay to operate and lock over its upper winding and contact to grounded conductor 114. Relay 118 also removes ringing current from the connection and closes the tip and ring conductors through for communication purposes.

When the subscribers complete the conversation and restore the receivers to their respective supports, the automatic switches are released and all equipment is restored to its normal condition.

A variable resistance 38 may be connected in shunt of condenser 26 by operating switch 39 to its closed position and thus preclude charging of condenser 26 due to leakage of light from window 20 around the cathode 23 of lamp 15 through lens 19 to the phototube 21. The necessity for resistor 38 will be minimized by the leakage of electron flow from cathode 12 to control anode 14 of trigger tube 11 on the positive half waves of ringing current without breakdown of the tube.

Fig. 4 illustrates a modification of the circuit disclosed in Fig. 1 and is intended to replace that portion of the latter contained within the broken lines *x—y*. This modification precludes the possibility of lost calls which might otherwise occur because of failure of the glow lamp 15.

Under normal conditions, that is with lamp 15 in proper working condition the condenser 26 will charge as previously described to effect the delay in the operation of ringer 10. However, if the lamp 15 of Fig. 1 fails to light, the ringer 10 would not operate and all calls incoming to station A would be lost. To avoid this possibility a thermistor 40, a rectifier 41, a slow-to-release relay 43 and a variable resistance 42 are added to the circuit of Fig. 1 as shown in Fig. 4. The thermistor may be of any well-known type which is designed to heat at a rate such as to give the maximum delay desired. Rectifier 41 serves to trap the charge on condenser 26 during positive half waves of ringing current, which charge is accumulated during the negative half waves. Thus when ringing current is impressed on the primary of transformer 110, with the lamp 15 disabled, condenser 26 will charge through thermistor 40 and rectifier 41 during the negative half cycles to eventually raise the potential of the control anode 14 of trigger tube 11 to a value at which the tube 11 fires. When this occurs an obvious operating circuit for slow-to-release relay 43 is completed in which the relay operates. In operating, relay 43 connects the ringer 10 to the ringing circuit causing it to operate as an audible signal. Operation of ringer 10 without a previous visual indication of an incoming call indicates failure of the lamp 15.

In the modification shown in Fig. 5 the gaseous discharge lamp 15 and the phototube 21 of Fig. 1 are replaced by a double plate electrode cathode glow lamp 50 and a silicon photo-conductive device 51, respectively. The glow lamp 50 which is a tube for the production of modulated light may consist of two parallel plane electrodes 1 and 2 placed in such close proximity that the discharge occurs between the outer surfaces of the electrodes instead of between the inner surfaces. When the electrode spacing and gas pressure are correct a uniform glow appears on the outer surface of the cathode. (A tube of this type is disclosed and described on page 450 of "Theory and Applications of Electron Tubes", second edition, by Reich.) When ringing current is impressed on the transformer 110 in the manner previously described, plate 1 of the lamp 50 becomes the cathode on the negative half cycles and gives forth light to energize the photo-conductive device 51 through the lens 19 causing condenser 26 to be charged in the manner previously described. On the positive half waves electrode 2 becomes the cathode and is illuminated to furnish a visual signal at the window 20 of box 16. At this time the electrode 1 of tube 50 is dark so that the resistance of light sensitive cell 51 is increased to trap the charge on condenser 26. As in the case previously described when the accumulated charge on condenser 26 has reached a sufficiently high value the trigger tube 11 fires and completes the connection of the ringer 10 to the ringing current circuit. The ringer then functions to give forth an audible signal. The iris shutter 25 is controlled by the subscriber in the manner hereinbefore described to regulate the quantity of light which reaches the light sensitive device 51. As this quantity of light is increased or decreased at the will of the subscriber the period of delay in the operation of the audible signal is decreased or increased, respectively.

The light sensitive device 51, per se, may take any suitable form. The fundamental requirement of the device is its capability of varying its electrical resistance inversely with the quantity of light to which it is exposed. A suitable device of this character is disclosed in a copending application of G. K. Teal, Serial No. 655,695, filed March 30, 1946.

What is claimed is:

1. The combination in a telephone system of a line, a station on said line, a source of signaling current, means connecting said source to said line, a lamp at said station energized by current from said source, a ringer at said station, a time measuring condenser at said station, a charging circuit for said condenser including light sensitive means adapted to be illuminated by light from said lamp, means at said station for regulating the illumination of said light sensitive means by the light from said source to variably control the charging time of said condenser, and means responsive to the charge accumulated on said condenser at the end of a predetermined interval of time for rendering said ringer responsive to current from said source.

2. The combination in a telephone system of a subscriber's line having a station thereon, a source of signaling current, means for connecting said source to said line, a light-emitting signaling device at said station energized by current from said source to provide a visual calling signal, an audible signaling device at said station, a condenser at said station for measuring a predetermined interval of time following the connection of said source to said line, light sensitive means adapted to be illuminated by light from said light-emitting signaling device included in the charging circuit of said condenser, the rate at which said condenser is charged being commensurate with the amount of illumination of said light sensitive means, manually operable means at said station for regulating the illumination of said light sensitive means, and means responsive to the charge accumulated on said condenser at the end of a predetermined interval of time for rendering said ringer responsive to current from said source.

3. The combination in a telephone system of a subscriber's station, a source of alternating current, a lamp at said station, a ringer at said station and means for rendering said lamp and ringer responsive to current from said source in a predetermined timed sequence comprising a normally inert space discharge tube for connecting said ringer to said source and having a control electrode, a condenser connected for charging to said source and poled so as to apply a firing potential to the control electrode of said tube to cause said tube to fire and connect said ringer to said source, light sensitive means included in the charging circuit of said condenser, and means for directing light from said lamp in variable amounts to said light sensitive means to variably control the charging time of said condenser.

4. A call signaling unit for use at a telephone subscriber's station comprising in combination with a telephone line a light emitting signaling device normally connected to said line, an audible signaling device normally on open circuit with respect to said line, means for connecting said audible signaling device to said line, a photoelectric tube for controlling the operation of said connecting means, and means for focusing light emitted from said light emitting signaling device onto said photoelectric tube.

5. A call signaling unit for use at a telephone subscriber's station comprising in combination with a telephone line, a light emitting signaling device normally connected to said line, an audible signaling device normally on open circuit with respect to said line, means for connecting said audible signaling device to said line, a light sensitive device for controlling the operation of said connecting means, means for focusing light emitted by said light emitting signaling device onto said light sensitive device, and subscriber-controlled means for regulating the extent to which light from said light emitting signaling device is focused on said light sensitive device.

6. A call signaling unit for use at a telephone subscriber's station comprising in combination with a telephone line, a light energy emitting device normally connected to said line, a signaling device normally on open circuit with respect to said line, means for connecting said signaling device to said line, a light sensitive device for controlling the operation of said connecting means, means for directing the light energy of said light emitting device to said light sensitive device, and means for regulating the amount of light energy directed to said light sensitive device.

STANLEY B. KENT.

REFERENCES CITED

The following references are of record in the file of this patent:

UNITED STATES PATENTS

| Number | Name | Date |
|---|---|---|
| 1,848,839 | Ranger | Mar. 8, 1932 |
| 1,860,007 | Bascom | May 24, 1932 |
| 1,901,919 | McKee | Mar. 21, 1933 |
| 2,084,267 | Hicks | June 15, 1937 |
| 2,186,542 | Gloess | Jan. 9, 1940 |
| 2,302,544 | Halligan | Nov. 17, 1942 |
| 2,428,007 | Boardman | Sept. 30, 1947 |
| 2,461,241 | Shann | Feb. 8, 1949 |

FOREIGN PATENTS

| Number | Country | Date |
|---|---|---|
| 444,074 | Great Britain | Mar. 12, 1936 |

OTHER REFERENCES

Serial No. 326,650, Danvillier (A. P. C.), pub. May 18, 1943.